United States Patent [19]

Ferlanti

[11] Patent Number: 4,828,134

[45] Date of Patent: May 9, 1989

[54] LAYERED COOKING VESSEL

[76] Inventor: William Ferlanti, 20 Cambridge Dr., North Caldwell, N.J. 07006

[21] Appl. No.: 115,819

[22] Filed: Nov. 2, 1987

[51] Int. Cl.$^4$ .............................................. B65D 23/00
[52] U.S. Cl. ..................................... 220/83; 220/406; 220/408
[58] Field of Search ................. 220/83, 400, 405, 406, 220/407, 408

[56] References Cited

U.S. PATENT DOCUMENTS

| | | | |
|---|---|---|---|
| 1,574,259 | 2/1926 | Sarff | 220/406 |
| 2,174,425 | 9/1939 | Schlumbohm | 220/408 X |
| 2,542,413 | 2/1951 | Ibsch, Jr. | 220/406 |
| 3,047,188 | 7/1962 | Durbin | 220/405 |
| 4,182,462 | 1/1980 | Buff, Jr. | 220/406 X |

Primary Examiner—Steven M. Pollard
Attorney, Agent, or Firm—Thomas L. Adams

[57] ABSTRACT

A layered cooking vessel has a plurality of nested metal layers stacked from a highest one to a lowest one. Each one of the layers above the lowest one has a border folded downwardly to interlock with the next lower one of the layers. Each one of the layers above the lowest one has on its border an annular score dividing that one of the layers into a removable strip and a central bed. This removable strip is removable to reduce the size of the border to prevent interlocking with the next lower one of the layers. Thus successive ones of the layers can be removed. Instead of the scoring, the border can be made flexible to allow manual extension and lifting of the border to remove it from the lower ones of the layers without tearing.

31 Claims, 2 Drawing Sheets

U.S. Patent  May 9, 1989  Sheet 1 of 2  4,828,134
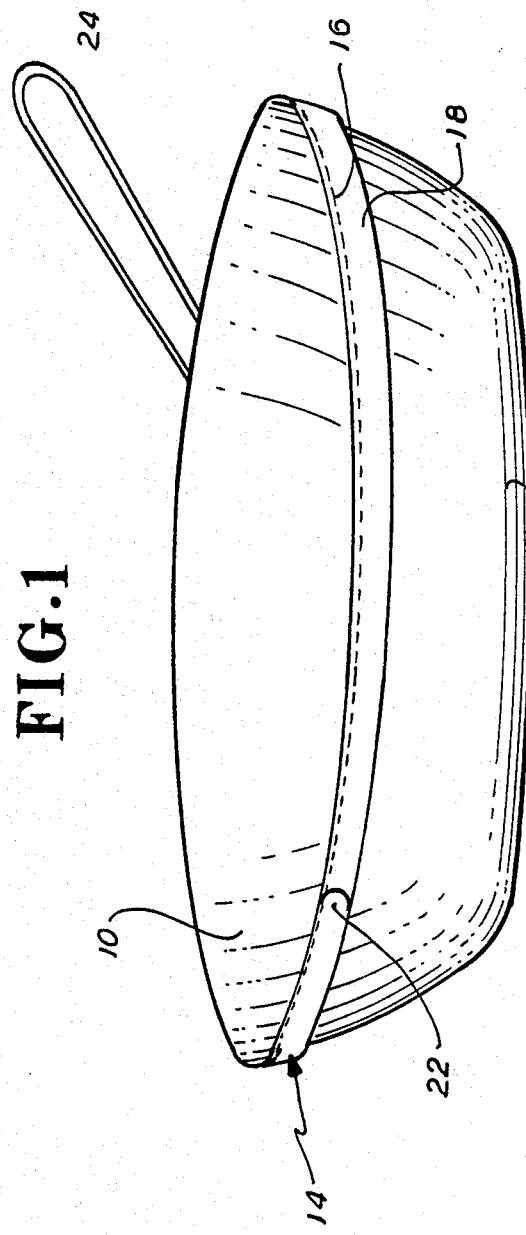
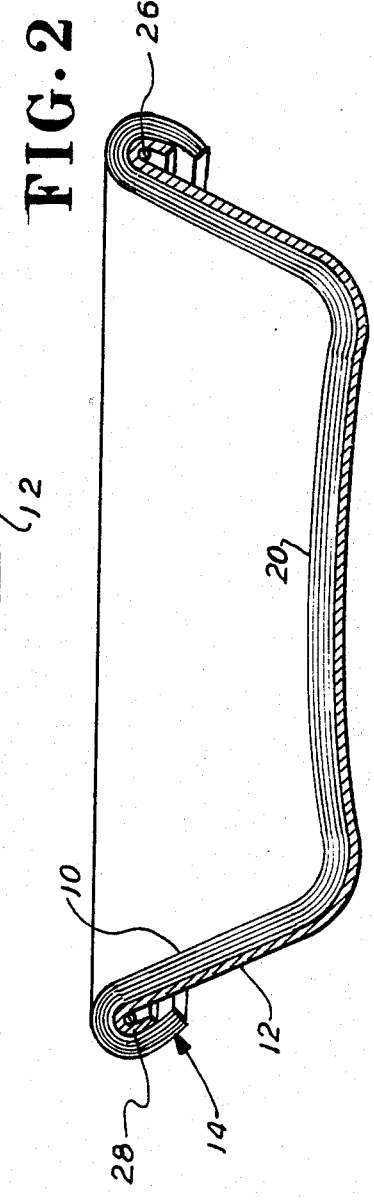

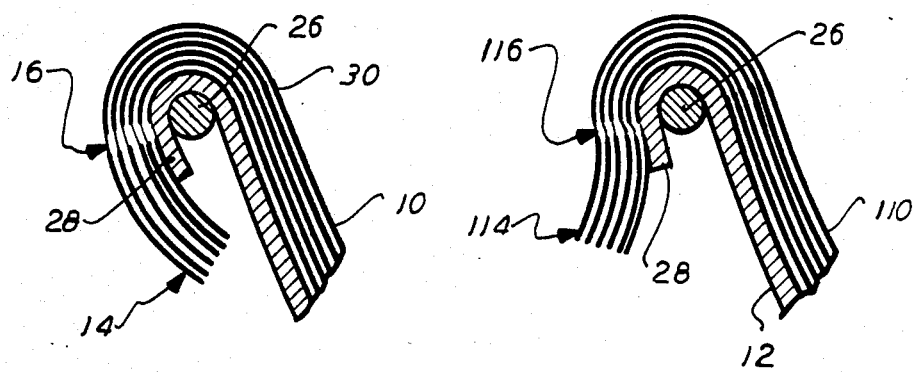
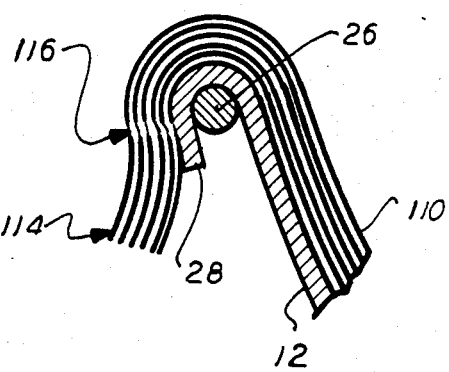
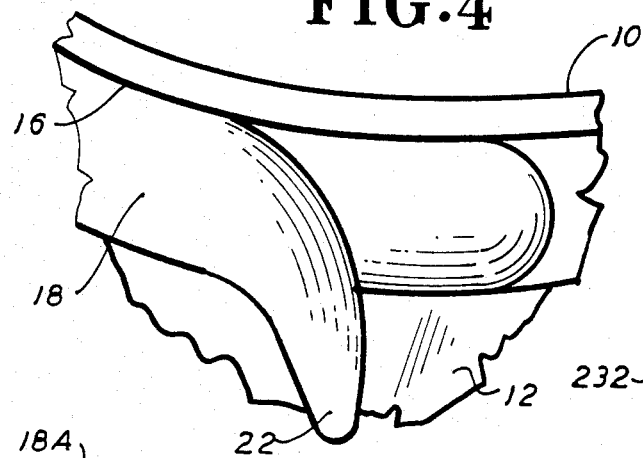
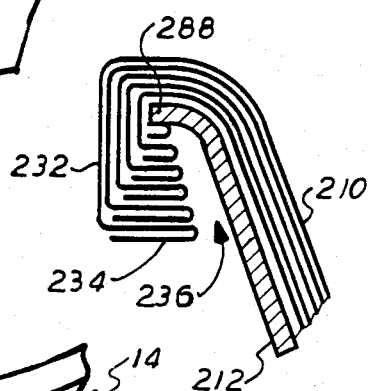
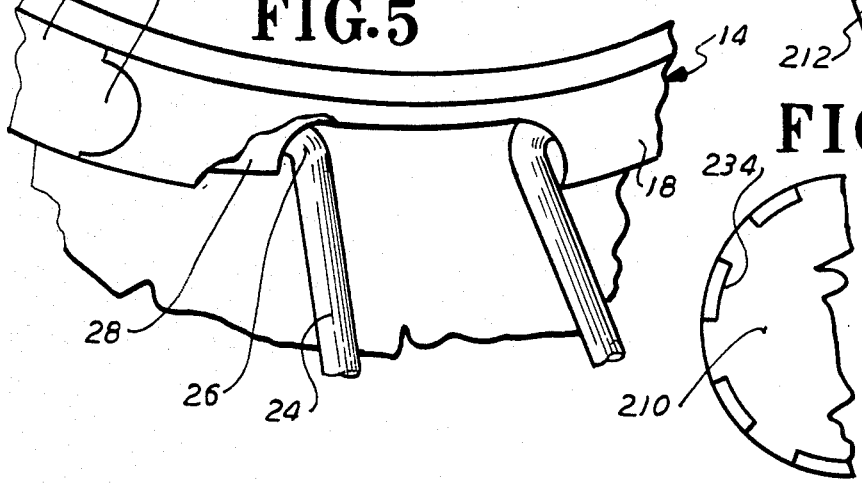
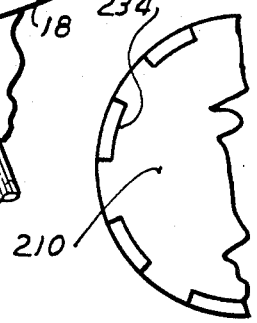

LAYERED COOKING VESSEL

BACKGROUND OF THE INVENTION

The present invention relates to layered cooking vessels, and in particular, to a vessel with successive layers that can be removed after using, so the user need not clean.

In a society with many families having dual wage earners, a great emphasis is placed on labor saving devices. There is a great need for saving labor and expediting the preparation of meals.

It is known to fabricate dishes having a plurality of nested layers. The plate need not be clean, but instead, successive layers are discarded. See for example, U.S. Pat. Nos. 730,082; 1,574,259; and 3,362,604. These dishes have been made of relatively fragile materials and were therefore unsuitable for use as a cooking vessel. The layers have been formed of paper or plastic and would be likely to ignite if used for cooking.

In U.S. Pat. No. 2,542,413 layers made of paper, plastic or composition material can be removed by pulling a tear strip. Note however, the material is still too fragile for cooking.

There are known nested metal receptacles proposed for use as ashtrays or reflector pans: U.S. Pat. Nos. 1,912,860; 3,165,201. The disadvantage with these known systems is that they are kept together simply by the force of gravity. The successive layers disengage simply by lifting the top-most receptacle and discarding it. This unsecured stack of receptacles would be inappropriate for use as a cooking vessel such as a frying pan. The user would either have to use relatively heavy layers to keep the layers from coming apart or risk spilling them if the vessel is upset. Also, if the layers become misaligned, there is a possibility they will become distorted with use. Any distortion would cause a significant air gap between layers which will reduce the ability to transfer heat into the vessel.

Accordingly, there is a need for a cooking vessel with disposable layers that can withstand the heat of cooking and maintain good alignment and heat transfer capability in everyday usage.

SUMMARY OF THE INVENTION

In accordance with the illustrative embodiments demonstrating features and advantages of the present invention, there is provided a layered cooking vessel, The vessel has a plurality of nested metal layers, stacked from the lowest one to the highest one. Each one of the layers above the lowest one has a border folded downwardly to interlock with the next lower one of the layers. Each one of the layers has on its border an annular score dividing that one of the layers into a removable strip and a central bed. This removable strip is removable to reduce the size of the border and to prevent interlocking with the next lower one of the layers. Thus successive ones of the layers can be removed. An alternate layered cooking vessel, according to the principles of the same invention, also employs a plurality of nested metal layers stacked from a highest one to a lowest one. Again, each one of the layers above the lowest one has a border folded downwardly and inwardly to interlock with the next lower one of the layers. This border is made flexible to allow manual extension and lifting of the border to remove it from the lower ones of the layers, without tearing the border.

By employing such an apparatus, an improved layered cooking vessel is achieved. In a preferred embodiment, metal layers are stacked inside of a reusable pan. In this embodiment, the border of each layer is folded over the edge of the pan to hold it in place. This border is scored and has a tab which may be lifted to pull away the bottom of the border. Once removed, the entire layer can be discarded to expose a clean surface.

For those embodiments providing a relatively large vessel, the tear-away border can be segmented into two bands lying end to end. This makes it relatively easy to remove the border since one need not manipulate a long removable strip.

In one preferred embodiment, the stacked layers can be purchased as a stack separately from the pan. In this situation, the stacked layers have borders with flared edges. This makes it relatively easy to snap the stacked layers onto the pan, making the pan readily reusable.

In an alternate preferred embodiment, the borders of the stacked layer have several tabs that are each folded into two sections: one section that is folded downwardly and inwardly; and a second section that is folded downwardly and outwardly. These folded tabs can be made successively larger for higher layers. This makes it easy to grasp the top-most layer.

Also, easy removal can be facilitated by having the tabs occupy less than the entire periphery. For example, eight equally spaced tabs can be placed on the periphery of each layer so that the layers are held securely but can be removed by hand.

Also, in this preferred embodiment, the reusable pan can be stamped to have a notched lip that is folded around wire hoop that, at one position, extends radially outward to provide a wire handle.

BRIEF DESCRIPTION OF THE DRAWINGS

The above brief description as well as other features and advantages of the present invention will be more fully appreciated by reference to the following detailed description of presently preferred but nonetheless illustrative embodiments in accordance with the present invention when taken in conjunction with the accompanying drawings wherein:

FIG. 1 is a top perspective view of a layered cooking vessel according to the principles of the present invention;

FIG. 2 is a vertical sectional view of the cooking vessel of FIG. 1;

FIG. 3 is a detailed of the border of FIG. 2;

FIG. 4 is a detailed view of the tab of FIG. 1;

FIG. 5 is a detailed view of the junction of the handle and hoop for the vessel of FIG. 1;

FIG. 6 is a detailed view of a border that is an alternate to that of FIG. 3;

FIG. 7 is a detailed view of a border that is an alternate to that of FIG. 6; and FIG. 8 is a plan view of one of the layers of FIG. 7.

DETAILED DESCRIPTION OF THE PREFERRED EMBODIMENTS

Referring to FIGS. 1 and 2, a cooking vessel is shown as a plurality of nested metal layers 10, the lowest one of the layers, being shown as a reusable frying pan, 12. As described further hereinafter, the nested metal layers make intimate contact with each other and with pan 12.

The edge of each of the layers 10 is folded downwardly and inwardly to provide a border 14, that has a score 16. Score 16 divides each of the layers 10, into a removable strip 18 and a central bed, shown here as central crowned portion 20. The removable strip 18, has an end that is formed into a manually graspable tab 22. By lifting and pulling tab 22, removable strip 18 can be torn off. Preferably, each tab 22 can be numbered in descending order to show the number of layers remaining. In the embodiment of FIG. 1, removable strip 18 can be formed as two bands that are placed end to end. This ensures that the strip, as it is removed, does not become excessively long and difficult to manipulate.

In this embodiment, a handle is formed from wireloop 24 to act as a gripping member that extends around pan 12 to form a hoop 26 that is held in place by downwardly bent lip 28.

Referring to FIG. 3, the detailed view of layers 10 shows them composed of six separate metal layers with a thickness of 0.004 to 0.010 inch, depending upon the desired strength when heated. Preferably, the thickness of the each layer is 0.006 inch. The layers 10 can be pressed together by a die, vacuum forming technology or other techniques designed to press the layers into close contact. The number of layers can be varied depending upon the application. A range of two to fifty layers may be employed but other numbers outside this range are expected as well.

It is desirable to ensure an efficient heat transfer, that layers 10 be coated with a film of a heat transferring liquid 30, which may be a vegetable oil or other nontoxic fluid that does not tend to decompose. In some embodiments, instead of a liquid, the film may be formed of a deposition of polytetraflouroethylene (Trademark: Teflon). The hoop 26 is shown trapped within lip 28. It will be appreciated however that in some embodiments, a hoop may be eliminated and the top edge of the pan 12 can be formed into an enlarged bead to facilitate clipping of the layers 10 to pan 12. It will also be understood that in some embodiments, pan 12 may not be a distinct member and may simply be the last layer which may or may not be of a different thickness. It is, of course, desirable that the last layer be of a suitable thickness to allow its separate use as a cooking vessel.

Referring to FIG. 4, a detailed perspective view is given of tab 22 of the removable strip 18. As illustrated, tab 22 is being lifted away from the next lower border so that the top layer can be discarded.

Referring to FIG. 5, it shows a detailed view of the junction between wire gripping member 24 and hoop 26. Lip 28 is shown having a notch to allow clearance for the junction between wire loop 24 and hoop 26. Similarly, border 14 is notched to allow the same clearance. As noted before, tab 22A is at a position diametrically opposite to the previously illustrated tab (Tab 22). Also, tab 22A is positioned so that the user does not begin tearing strip 18A at the notched area illustrated in FIG. 5. Clearly, tearing at the notch would be difficult since there the width of strip 18A is substantially reduced and its fragility may cause it to break.

Referring to FIG. 6, pan 12 is fitted with an alternate stacked layer 110. In this figure, related components have either the same reference numeral or if modified, a reference numeral increased by 100.

Stacked layers 110 have scores 116 to provide a removable strip in the form of a flared outer edge 114. In a similar fashion, tabs (not illustrated in this figure) can be manually grasped and removed by tearing along the score 116.

The flaring of outer edges 114 is helpful since it allows pan 12 to be readily reused. When layers 110 have all been removed, a new set of layers can be installed by snapping them over lip 28. Because ends 114 are flared, stacked layers 110 can be easily centered and pressed downwardly, guided by flared ends 114.

Referring to FIG. 7, it shows an alternate stack 210. In this figure, corresponding components have either the same reference numeral or if the component was modified, a reference numeral increased by 200. In this embodiment pan 212 is shown having the same thickness as pan 12 (FIG. 1) so as to be reusable, although this heavy-duty thickness is not necessary for all embodiments. Each of the layers of stack layer 210 end with an inner and outer band 232 and 234. Inner band 232 folds downwardly and inwardly. Outer band 234 folds downwardly and outwardly. Each of the outer bands 234 become progressively larger for higher layers. Consequently, the top-most layer of layers 210 may be easily grasped at the outer band 234. Because of the staggered sizing, only one layer at a time can be grasped. The user does not accidentally grasp more than one layer, because of this sizing.

Referring to FIG. 8, a bottom plan view is given of one of the layers 210 of FIG. 7. In this embodiment, the outer bands 234 are shown lying not along the entire periphery, but along discrete sections thereof. In this embodiment, eight peripheral outer bands 234 are located at equally spaced, 45 degree intervals and are each 22.5 degrees in length. Being configured in this fashion, layers 210 are more easily removed. In some embodiments, however, the bands 232/234 are uninterrupted to form a continuous annular tab.

To facilitate an understanding of the principles associated with the foregoing apparatus, its operation will be briefly described in connection with FIGS. 1–5. It will be appreciated that the operation for the other figures is substantially the same. The reusable pan 12 can have pressed onto it by a die or similar apparatus (not shown) layers 10 each having a border 14 with a score 16. The pan and its layers can be used as a unitary frying pan in the usual fashion. Because heat-transferring fluid 30 exists as a film between adjacent layers, heat transference is good. The center of pan 12 and the central portion 20 of the layers 10 are crowned to provide a more even heat flow and to allow for even distribution of fluids cooking within the vessel.

After using and cooling the vessel, the top most layer can be removed so that washing is unnecessary. To remove the layer, one grasps tab 22 pulling it outwardly. Consequently, removable strip 18 tears away from border 14 along score 16. Subsequently, rear tab 22A can be grasped and pulled outwardly to remove the other half of removable strip 18A. Once the removable strips 18 and 18A are gone, border 14 is reduced to where it no longer locks onto pan 12. Consequently, the uppermost one of the layers 10 can be easily removed. Thereafter, the assembly can be used as before to cook.

It is to be appreciated that various modifications may be implemented with respect to the above described preferred embodiments. For example, the length and depth of the cooking vessel can be altered depending upon the cooking requirements. Furthermore, instead of a frying pan, variously shaped pots or roasting pans can be employed instead. Also while the removable layers are described as having a preferred thickness of 0.006 inch, in some embodiments, the preferred thickness can be changed. However, it is desirable that the layers be thick enough to prevent interlayer welding and thin enough so that layers can be economically discarded. It will be appreciated that it is unnecessary to discard a layer after every use, but only after usage which the layer soils unacceptably. The wire handle can be replaced with a conventional solid handle riveted in place by a flange. Also, the pan and its layers can be fabricated by various metals including aluminum and steel, depending on the desired strength and heat conductivity. Additionally, the intermediating film between adjacent layers can be formed of various non-toxic substances that have good heat transfer characteristics. It will be appreciated that the removable strip can be removed in various fashions and in some embodiments, the removable strip may be centered within the border, so that the center of the border is removed without removing the outer edge of the border.

It will be further understood that the manner in which the border is folded can be varied according to the desired gripping strength, the size of the lip and depending on whether a thicker pan is used as the lowermost layer. The various other dimensions can be altered depending on the desired size of the vessel, heat stability, temperature transfer, structural integrity, etc.

Obviously, many modifications and variations of the present invention are possible in light of the above teachings. It is therefore to be understood that within the scope of the appended claims, the invention may be practiced otherwise than as specifically described.

What is claimed is:

1. A layered cooking vessel comprising:
   a plurality of nested metal layers stacked from a highest one to a lowest one, each one of the layers above the lowest one having a border folded downwardly to interlock with the next lower one of said layers, each one of the layers above the lowest one having on said border an annular score dividing that one of the layers into a removable strip and a central bed, said removable strip being the outer ultimate portion of each of said layers above said lowest one, said removable strip being removable to reduce the size of said border to prevent interlocking with said next lower one of said layers so that successive ones of said layers can be removed, said removable strip having at least one end formed into a manually graspable tab, said tab having about the same radial dimension as said removable strip to allow removal of said outer ultimate portion of each of said layers above said lowest one.

2. A layered cooking vessel according to claim 1 wherein said lowest one of said layers is thicker than the other ones.

3. A layered cooking vessel according to claim 1 further comprising a heat transferring liquid between adjacent ones of the layers above the lowest one.

4. A layered cooking vessel according to claim 2 wherein said removable strip comprises: two bands positioned end-to-end to form a closed loop, each of said bands having a manually graspable end, each manually graspable end being diametrically opposite from the other.

5. A layered cooking vessel according to claim 2 wherein said border has an outer edge flared to allow each of the layers above the lowest one to be snapped onto the lowest one of the layers, so that the lowest one of the layers can be relined.

6. A layered cooking vessel according to claim 5 wherein said lowest one of said layers has a radially projecting handle.

7. A layered cooking vessel according to claim 6 wherein said handle has a gripping member and a hoop encompassing said lowest one of said layers, said lowest one of said layers having a lip folded over said hoop to secure it.

8. A layered cooking vessel according to claim 7 wherein said gripping member is a wire loop.

9. A layered cooking vessel according to claim 7 wherein said lip is notched to allow clearance for the junction between said gripping member and said hoop.

10. A layered cooking vessel according to claim 9 wherein each of the layers above the lowest one having a border that is notched to allow clearance for the junction between said gripping member and said hoop.

11. A layered cooking vessel according to claim 6 wherein said lowest one of said layers is a reusable frying pan.

12. A layered cooking vessel according to claim 6 wherein said annular score has a thickness that is 10% to 60% of that of said border.

13. A layered cooking vessel according to claim 12 wherein each of said layers above the lowest one has a thickness of between 0.004 to 0.010 inch.

14. A layered cooking vessel according to clailm 13 wherein the lowest one of said layers has a thicknesss of between 0.020 to 0.050 inch.

15. A layered cooking vessel according to claim 14 wherein said layers above the lowest one have thickness of about 0.006 inch and the lowest one of said layers has a thickness of about 0.026 inch.

16. A layered cooking vessel according to claim 6 wherein said central bed is crowned.

17. A layered cooking vessel according to claim 1 wherein each of said removable strips has an end marked numerically and sequentially 18. A layered cooking vessel comprising:
    a pluraltiy of nested metal layers stacked from a highest one to a lowest one, each one of the layers above the lowest one having a border folded downwardly and inwardly to interlock detachably with the next lower one of said layers, said border being of a thickness that permits said border to maintain a folded position by itself and stay detachably interlocked with the next lower one of said layers, said border being flexible to allow manual extension and lifting of said border to remove it from the lower ones of said layers without tearing said border.

19. A layered cooking vessel according to claim 18 wherein said border has an inner and outer band, said inner band being folded downwardly and inwardly, said outer band being folded downwardly and outwardly.

20. A layered cooking vessel according to claim 18 wherein said border is larger for lower ones of said layers.

21. A layered cooking vessel according to claim 20 wherein said outer band is larger for upper ones of said layers to allow the upper ones of said layers to protrude more and be removed earlier.

22. A layered cooking vessel according to claim 18 wherein said border comprises: a plurality of peripherally spaced tabs each folded downwardly and inwardly to interlock with the next lower one of said layers.

23. A layered cooking vessel according to claim 18 wherein said lowest one of said layers is thicker than the other ones.

24. A layered cooking vessel according to claim 23 wherein said lowest one of said layers has a radially projecting handle.

25. A layered cooking vessel according to claim 24 wherein said handle has a gripping member and a hoop encompassing said lowest one of said layers, said lowest one of said layers having a lip folded over said hoop to secure it.

26. A layered cooking vessel according to claim 25 wherein said lip is notched to allow clearance for the junction between said gripping member and said hoop.

27. A layered cooking vessel according to claim 26 wherein each of the layers above the lowest one having a border that is notched to allow clearance for the junction between said gripping member and said hoop.

28. a layered cooking vessel according to claim 24 wherein each of said layers above the lowest one has a thickness of between 0.004 to 0.010 inch.

29. A layered cooking vessel according to claim 28 wherein the lowest one of said layers has a thickness of between 0.020 to 0.050 inch.

30. A layered cooking vessl according to claim 18 further comprising a heat transferring liquid between adjacent ones of the layers above the lowest one.

31. A layered cooking vessel according to claim 24 wherein each of said layers has a central crowned portion.

* * * * *